Dec. 11, 1962 J. O. HRUBY, JR 3,067,876
CENTRIFUGAL SEPARATOR PROCESS AND APPARATUS
Filed Feb. 15, 1960 4 Sheets-Sheet 1

JOHN O. HRUBY, JR.
INVENTOR.

BY Beehler & Shanahan
ATTORNEYS.

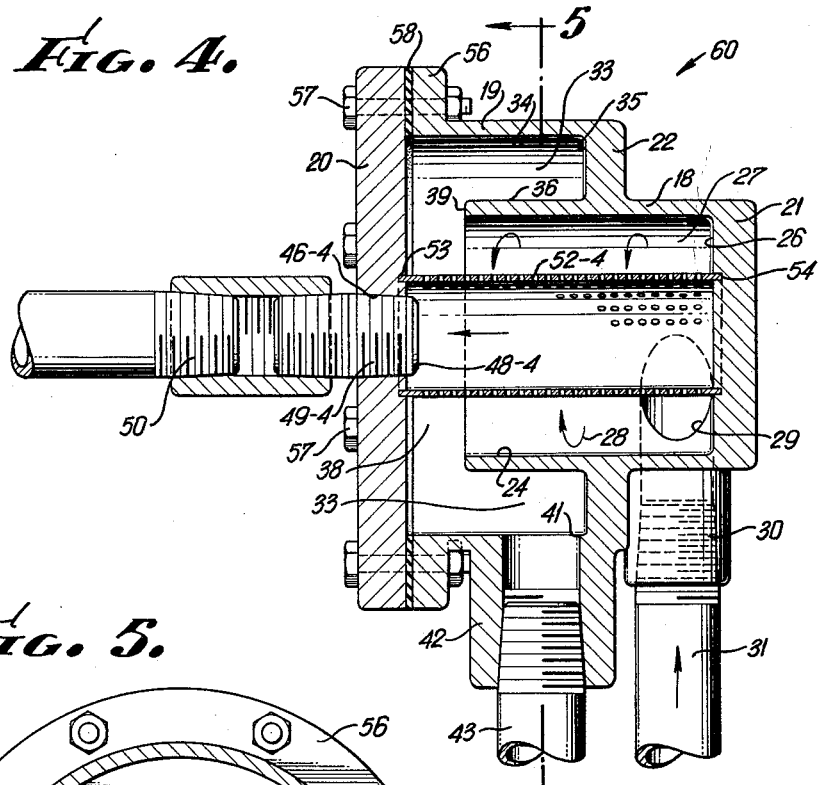
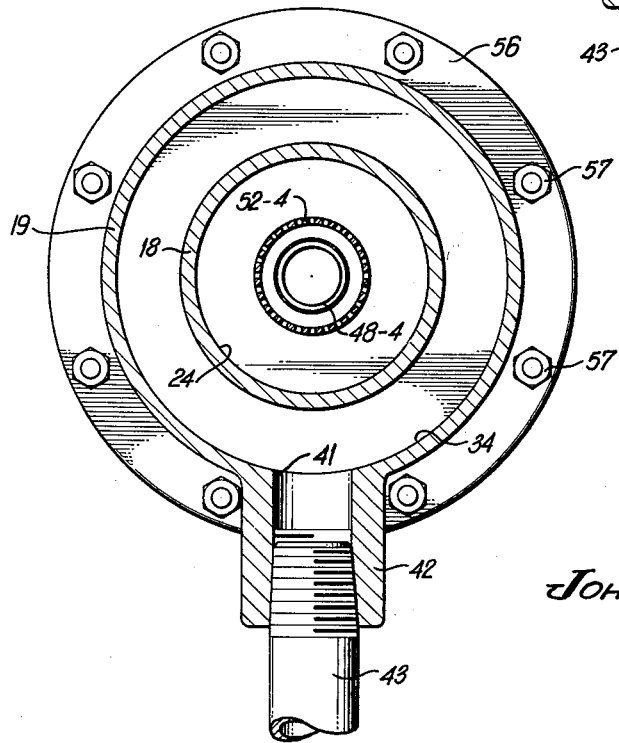

Dec. 11, 1962 J. O. HRUBY, JR 3,067,876
CENTRIFUGAL SEPARATOR PROCESS AND APPARATUS
Filed Feb. 15, 1960 4 Sheets-Sheet 3
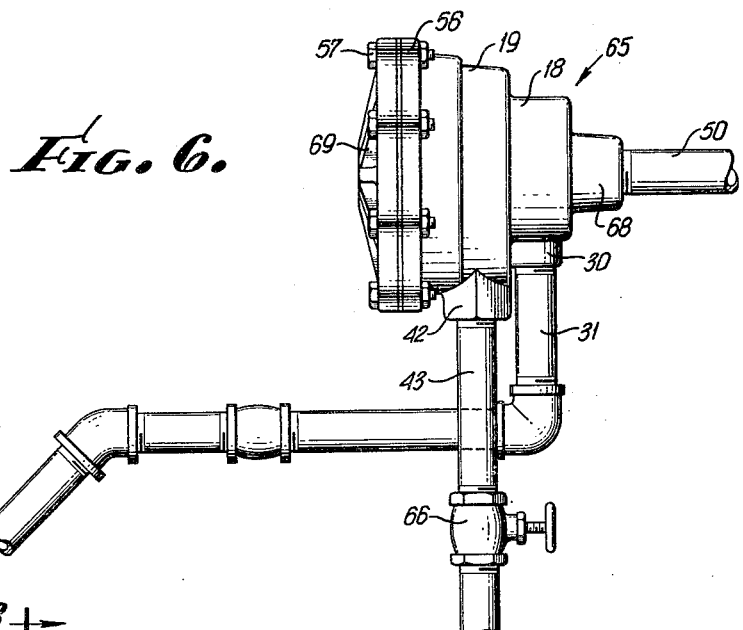
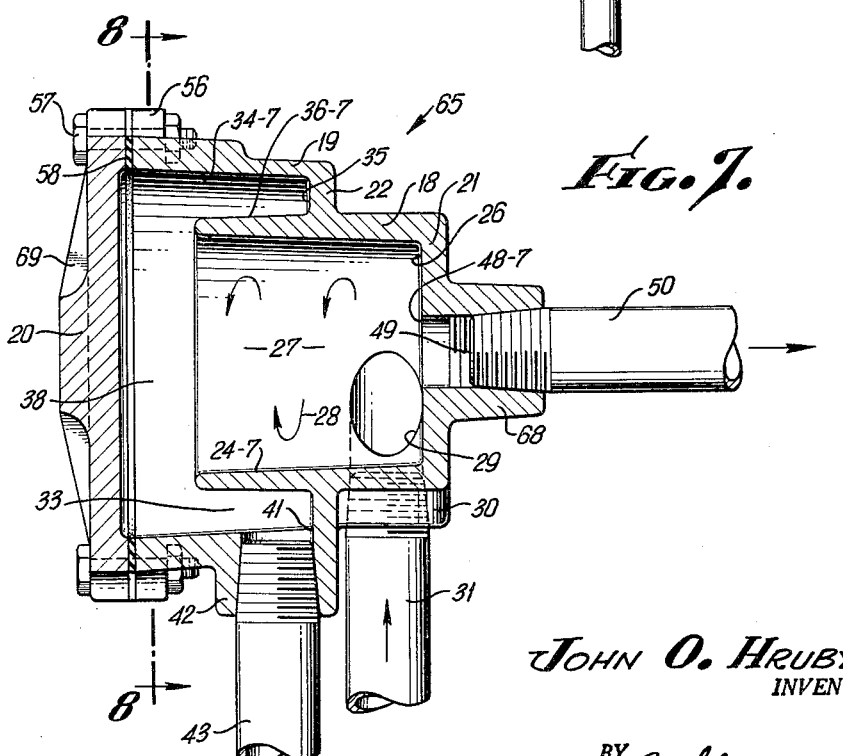
JOHN O. HRUBY, JR.
INVENTOR.
BY Beehler & Shanahan
ATTORNEYS.

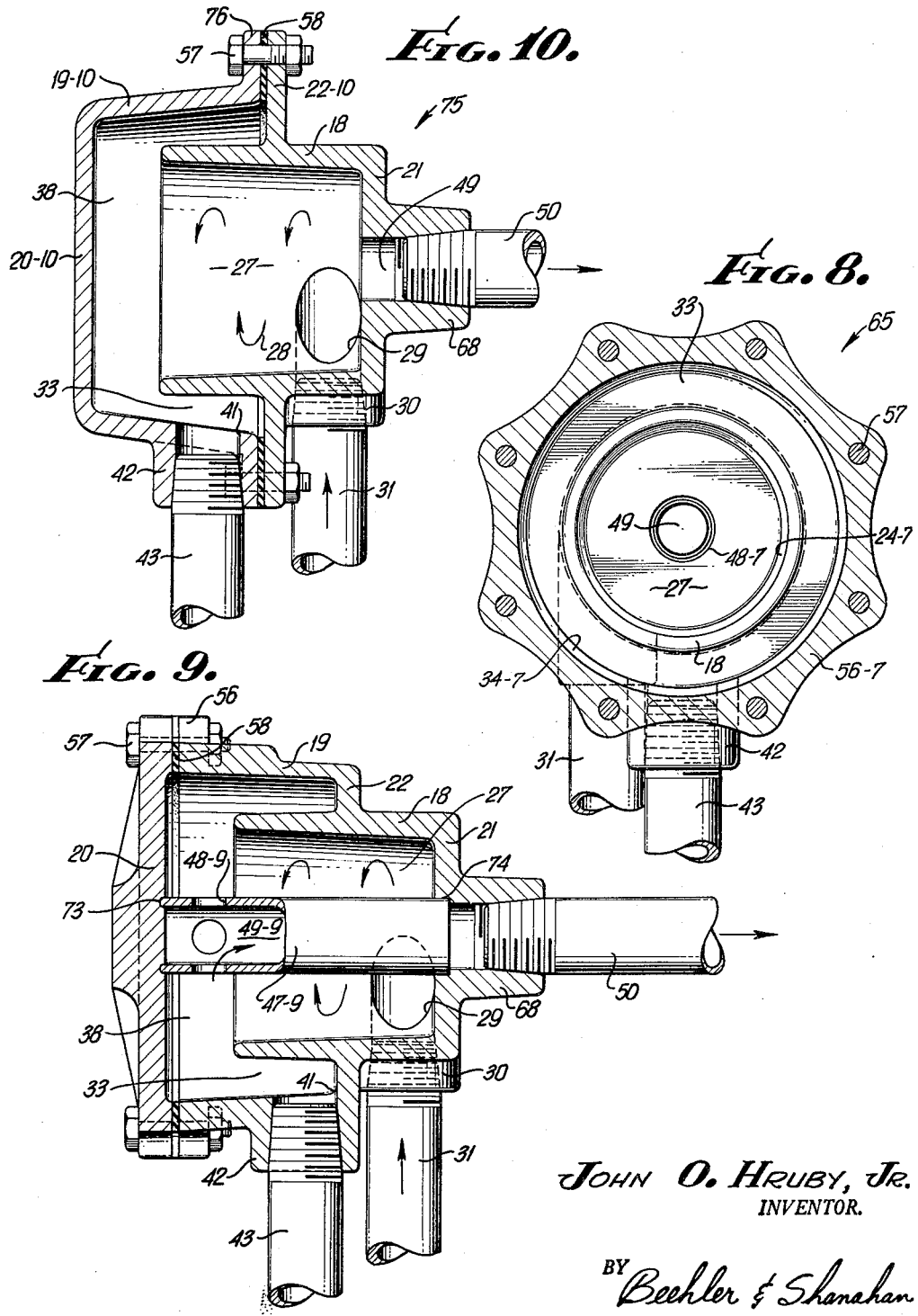

United States Patent Office 3,067,876
Patented Dec. 11, 1962

3,067,876
CENTRIFUGAL SEPARATOR PROCESS AND APPARATUS
John O. Hruby, Jr., Burbank, Calif., assignor to Rain Jet Corporation, Burbank, Calif., a corporation
Filed Feb. 15, 1960, Ser. No. 8,831
9 Claims. (Cl. 210—65)

This invention relates to separators for fluids to separate a heavier ingredient or foreign substance in the fluid from a lighter ingredient of the fluid by passing the heavier ingredient centrifugally from a swirl chamber and into a collection chamber.

This application is a continuation-in-part of my co-pending application, Serial No. 807,653, filed April 20, 1959, now abandoned.

The invention is advantageous when embodied in a device for filtering sand and other solids from water. Dust may be separated from air with a device of this invention whether the inlet for dust laden air be under pressure or the outlet for treated air be under suction. Also, it is contemplated that immiscible liquids may be separated by devices of this invention.

A general object of this invention is to provide an improved centrifugal separator which is simple and rugged in construction and efficient and reliable in operation.

Another object of this invention is to provide an improved centrifugal separator which is adapted to be embodied in a most compact design as compared with centrifugal separators made heretofore.

A specific object of this invention is to provide an improved centrifugal filter adapted to be installed in a water supply line for filtering sand and dirt particles from the water in the line.

A further object of this invention is to provide a separator of the above mentioned character and which is efficient in operation regardless of its orientation.

Another object of this invention is to provide a centrifugal filter having a filter screen partition for straining solid particles from a liquid and in which the filter screen is continuously washed by the liquid being filtered to prevent the screen from becoming clogged.

Other objects and advantages of the invention will appear in the following part of this specification wherein the details of construction and mode of operation of several embodiments are described with reference to the accompanying drawings, in which:

FIG. 1 is a section through a centrifugal separator embodying this invention, the section being taken on a plane which contains the axis of symmetry of the separator;

FIGS. 2 and 3 are cross-sections taken along lines 2—2 and 3—3, respectively, of FIG. 1;

FIG. 4 is a section corresponding to that of FIG. 1, but through a centrifugal separator of another embodiment according to this invention;

FIG. 5 is a cross-section taken on line 5—5 of FIG. 4;

FIG. 6 is a side elevation of another embodiment, and showing the separator connected to pipes and fittings of the system;

FIG. 7 is a section corresponding to that of FIG. 1, but taken through the separator of FIG. 6 on an enlarged scale;

FIG. 8 is a cross-section taken along line 8—8 of FIG. 7; and

FIGS. 9 and 10 are sections corresponding to that of FIG. 1, but taken through still further embodiments, respectively.

Figure 1:
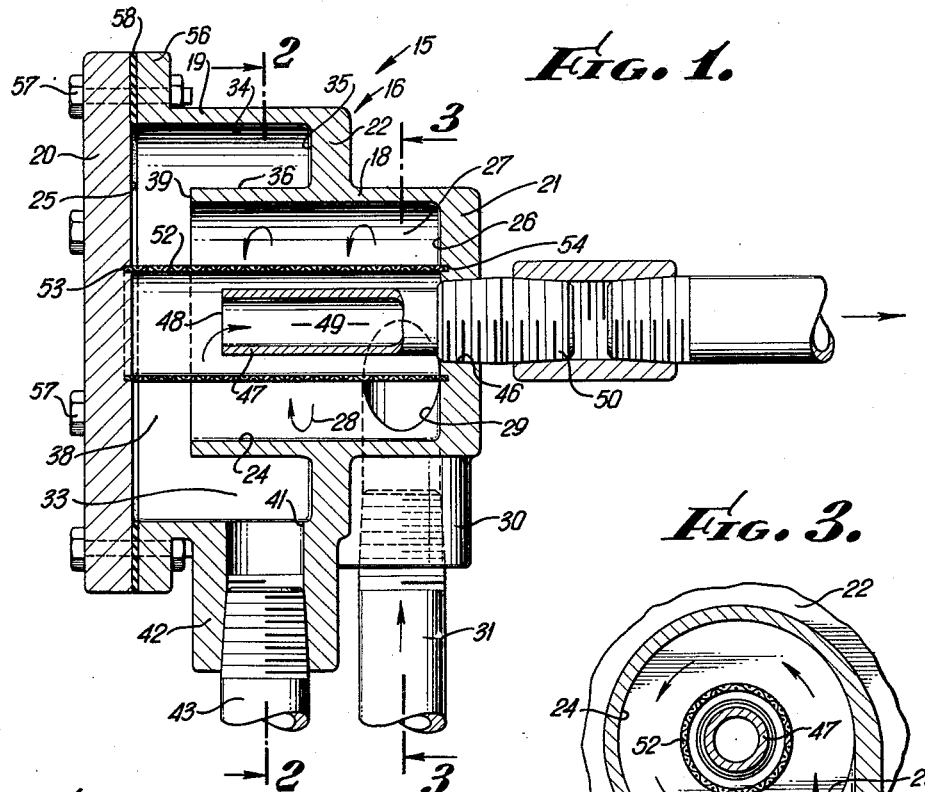
Figure 3:
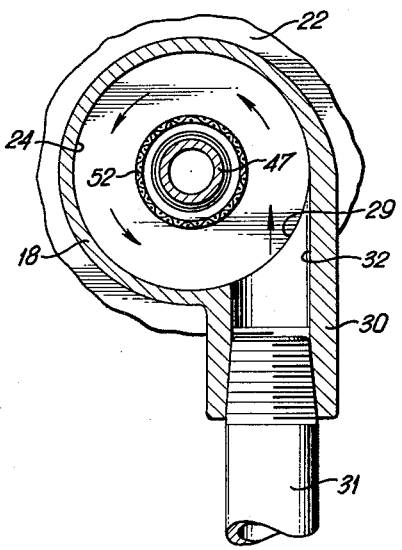
Figure 2:
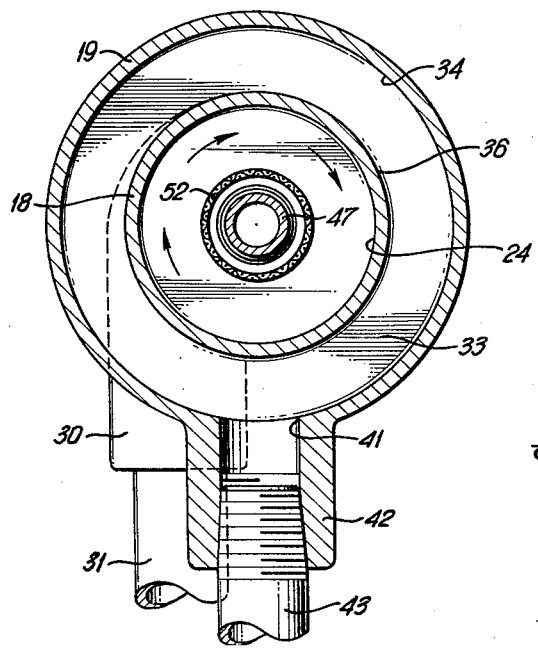

Referring to the drawing in detail, the invention is illustrated in FIGS. 1–3 as the same may be embodied in a filtering device, designated generally by reference numeral 15, and adapted to be installed in a water supply line for straining sand and other dirt particles from the water supply.

The device 15 comprises a hollow body 16, formed of metal, plastic or other suitable material, and having a cylindrical inner wall 18 of circular cross-section, a cylindrical outer wall 19, opposed end walls 20 and 21, and an annular end wall 22 for the outer cylindrical or annular wall 19.

The several illustrated embodiments of centrifugal separators of this invention are shown as being oriented in the same position, that is, with the longitudinal axis or axis of symmetry of the annular inner and outer walls extending horizontally. Such corresponding orientation has been done merely for the purpose of making the differences between the details of construction of the several embodiments more conspicuous. It is to be understood, however, that the devices of this invention operate satisfactorily when they are oriented otherwise than with their axes extending horizontally. For example, each device may be oriented for operation with its axis extending vertically.

For purposes of convenience in reference to the several parts of each of the illustrated embodiments, throughout the specification and in the claims the end wall 20 is referred to as being a front or forward end wall, while end wall 21 is referred to as being a rear end wall, it being understood, of course, that where a device is oriented with its axis extending vertically, for example, end wall 20 may be either an upper end wall or a lower end wall while end wall 21 would be a lower end wall or an upper end wall. Also, when each of the illustrated embodiments is viewed in its broad aspect, the end walls 21 and 22 may be considered together as defining rear end wall means of the device closing each of the swirl and collection chambers.

The inside surface 24 of the inner annular wall and the inside surfaces 25 and 26 of end walls 20 and 21, respectively, define a swirl chamber 27 wherein the fluid being treated (and specifically, for the case being described, water with sand particles) is caused to follow a helical path around in the body as indicated by directional arrows 28. For admitting the fluid to be treated into the swirl chamber, there is an inlet opening 29, which for the illustrated embodiments is formed in the rearward extension of the inner annular wall adjacent rear end wall 21 and which may be termed a body wall. A boss 30, formed integral with and extending outward from the body wall, is internally screw-threaded for connection of the body to a water supply pipe 31 whereby water to be treated flows from the supply pipe through opening 29 and into the swirl chamber.

For imparting rotary motion to water in the swirl chamber, the body has a surface or surfaces therein which deflect the water to follow its helical path. Any suitable structure, as, for example, a helical vane extending inwardly from the inner annular wall may be employed to form such water-deflecting surface; however, for ease and simplicity of construction, it is preferred to form the inlet-opening structure such that the inside surface 32 of the inlet opening 29 extends substantially tangentially with respect to the inside surface of the inner annular wall 18 thereby to impart rotary motion to water in the swirl chamber.

An annular chamber 33 for reception or collection of the heavier ingredient, e.g. sand, of the fluid being treated is defined by the inside surface 34 of the outer annular wall 19, the inside surface 35 of annular end wall 22, the outside surface 36 of inner annular end wall 18, and the outer marginal portion of inside surface 25 of the front end wall. The collection chamber is axially aligned with the swirl chamber. An annular passage 38 for flow of sand from the swirl chamber to the collection chamber is formed in the body forwardly of the inlet opening 29. Such passage is conveniently provided, as in the illustrated embodiments, by terminating the inner annular wall 18 short of the forward end wall, whereby the passage 38 is defined between the forward end edge or rim 39 of the inner annular wall and the inside surface 25 of the front end wall.

Because of the centrifugal force imparted to sand particles carried in the water in the swirl chamber, such particles will move radially outwardly to adjacent the inside surface of the inner annular wall. Then, too, inasmuch as the outlet passage 38 for the sand particles from the swirl chamber to the collection chamber is disposed forwardly of the inlet opening 29, the sand particles will have a forwardly directed moment of force along the inside surface of inner annular wall 18 whereby fluid in the swirl chamber will move in the helical path indicated by the directional arrows 28. When the sand particles reach the annular passage 38, the centrifugal force thereof will cause them to move outwardly through the passage 38 into the collection chamber.

The contents of the collection chamber are exhausted or dumped through a heavier-ingredient outlet opening 41 formed in a wall of the collection chamber outwardly with respect to the swirl chamber. In the illustrated embodiments outlet opening 41 is formed in the outer annular end wall. A boss 42, formed integral with and extending outwardly from the outer annular wall, is internally screw-threaded for connection of the body to a solids discharge pipe 43 which may lead to a place for waste disposal or to a suitable container for the collected solids.

In the illustrated embodiments, annular end wall 22 is spaced rearwardly from the annular passage 38 whereby the collection chamber extends coaxially of the swirl chamber, i.e. the collection chamber circumscribes the swirl chamber. Also, the solids outlet opening 41 is preferably disposed rearwardly of the rim 39. Such coaxial relationship of the collection and swirl chambers is preferred over an arrangement wherein the collection chamber extends forwardly of the rim 39, because it provides optimum compactness of the device. Another important advantage resulting from the coaxial arrangement of chambers is that because of such arrangement the solids are removed from possible reentrainment thereof in the fluid of the swirl chamber. When the body is formed of transparent plastic, it will be observed that the solids move as far as possible from the passage 38, that is, to adjacent the inside surface 35 of annular end wall 22. Even in the case where the collection chamber extends entirely forwardly of the rim 39, whereby the inside surface 35 would constitute the forward end wall of such collection chamber, the solids move to adjacent such forward end wall where they will be removed as far as possible from the annular passage 38. Also in the case where the collection chamber extends forwardly of the rim 39, it will be apparent that such forwardly extending collection chamber should be of relatively long axial length so as to keep the solids as far as possible from the passage 38. On the other hand, the preferred construction of coaxial arrangement of the collection and swirl chambers, as in the illustrated embodiments, makes it possible to employ a collection chamber of relatively short axial length, the solids in the collection chamber being retained against possible reentrainment in the swirl chamber because of the presence of the forward end portion of the inner annular wall 18 which serves as a partition separating the collection chamber from the swirl chamber. Also, by observing the operation of the sand particles in the collection chamber, it will be seen that they move toward adjacent the inside end surface 35 even though the outlet opening 41 is spaced forwardly of the end wall 22. Thus, to permit complete removal of solids from the collection chamber, it is advantageous to position the outlet opening 41 adjacent the end wall 22.

With the sand being driven outwardly by centrifugal force into the collection chamber, the collection chamber being, of course, filled with water and sand, the water in the swirl chamber from which the sand has been removed flows centripetally in the swirl chamber and is discharged from along the axis of the swirl chamber. In the embodiment of FIGS. 1–3 the outlet passage for the sand-free water extends through an opening 46 formed in the rear end wall 21 in axial alignment with the swirl chamber. The embodiment of FIGS. 1–3 is especially adapted for use in systems where it is desired to remove solid particles (sand) from liquids (water) and in which fluid flow through the device is intermittent. When fluid flow through the device is shut off, the swirl chamber may contain some sand particles. When the water supply is again turned on, it is likely that such remaining particles may enter the clear water outlet passage before optimum swirl conditions in the swirl chamber are reached. For this reason it is advantageous to position the opening for the clear water outlet passage forwardly of the inlet opening 29 whereby upon initiation of fluid flow through the device, an appreciable swirl of fluid in the inside chamber will be developed prior to an initially instantaneous time when the sand in the swirl chamber could otherwise pass into the clear water outlet passage. To this end, the clear water outlet passage is developed as a tube 47 extending forwardly from the opening 46, the tube being open at its forward end as an inlet opening 48 for the outlet passage, the outlet passage being designated by reference numeral 49. The outlet passage extends through the end wall opening 46 by a clear water outlet pipe 50 which is suitably connected to the separator body.

The separator 15 is further especially adapted for use in intermittent flow systems of water with solid particles entrained therein, by the provision of a filter partition 52 arranged coaxially in the swirl chamber. The filter partition may be formed as a cylindrical screen from a perforated sheet or from wire mesh, or from any porous or foraminous solid material. The illustrated partition 52 is secured within the body by having its end edges extend into annular recesses 53 and 54 formed in the inside surfaces of end walls 20 and 21, respectively.

For mounting the front end wall 20 upon the forward end of the outer annular wall 19, such outer end wall has an outwardly extending flange 56 for receiving the fastener bolts 57 which extend through the peripheral marginal portion of the end wall 20 and through the flange 46. A sealing gasket 58 is employed between the interfacing surfaces of the end wall and the flange.

Referring now to FIGS. 4 and 5 of the drawing, the same illustrate another embodiment of the centrifugal separator of this invention, this embodiment being designated generally by reference numeral 60. The separator 60 is closely similar in construction and mode of operation to that of the previously described embodiment. With the view to making the differences in details of construction more conspicuous, those parts of the separator 60 which correspond to parts respectively of the previously described embodiment are designated by reference numerals which are the same, respectively, as those employed to designate corresponding parts of separator 15. In those instances where the details of construction of the device 60 are different from their corresponding parts in the device 15, the reference numerals for the device 60 have the number 4 added to them.

The further device 60 of FIGS. 4 and 5 differs from that shown in FIGS. 1–3 in that the clear water outlet passage 49–4 extends through central opening 46–4 which is formed in the front end wall 20 so that the inlet opening 48–4 of the clear water outlet passage is spaced as far as possible from the inlet opening 29. Thus, there is no need for a passage extension tube such as that at 47 in the separator 15.

For installations where continuous filtering or particle separation is required, as, for example, in swimming pools, separators of this invention which are provided with filter screens 52 will not require periodic cleaning of the filter screens. Should any solids particles become adhered to the outside surface of the filter screen as during initiation of operation, the screen will be washed clear of such particles by the force of water swirling around in the swirl chamber.

In installations where substantially continuous operation is contemplated and the possibility of the flow of a small amount of the heavier ingredient into the lighter ingredient outlet passage during initiation of operation is of no consequence, the filter screen 52 may be eliminated. Another important alternate construction is that the inlet opening 48 for the clear water outlet passage 49 may be located proximate the inlet opening 29. Such alternate construction is contained in the embodiment illustrated in FIGS. 6 and 7 of the drawing.

Referring to FIGS. 6, 7 and 8, the centrifugal separator shown therein is designated generally by reference numeral 65. It is shown as the same may be installed in a typical installation having a valve 66 connected in the solids discharge pipe 43 enabling periodic dumping of solids from the collection chamber 33. The separator 65 is particularly distinct from those of the previously described embodiments in that the inlet opening 48-7 for its clear water outlet passage 49 is disposed in the inside surface 26 of rear end wall 21, and not forwardly of the inlet opening 29 as in the previously described embodiments. It would seem that the lighter ingredient flowing out through the outlet passage 49 of the device 65 would most likely be contaminated with heavier ingredient; however, such is not the case. As far as can be determined, the lighter fluid enters an imaginary core disposed axially of the swirl chamber and flows rearwardly to the opening 48-7 of the outlet passage. When the separator 65 is observed in operation, the body walls being formed of transparent plastic, and the outlet pipe 50 being connected to an air exhausting pump (not shown), and the inlet supply pipe 43 being open at its outer end to adjacent some loose sawdust, it will be seen that sawdust accumulates in collection chamber 33 from which the sawdust is removed through pipe 43, and that the air which is exhausted through outlet passage 49 to the pipe 50 is entirely free of sawdust.

The separator 65 has the inside surface 34-7 of outer annular wall 19, and outside surface 24-7 and outside surface 36-7 of the inner annular wall 18 of slightly frusto-conical configuration as distinguished from the straight cylindrical surfaces of the annular walls of the embodiment described thereinabove. Such frusto-conical surfaces are the result of a design which makes forming of the body easier as a unit except for the end wall or cap 20. Also the rear end wall 21 has a boss 68 formed integral therewith for connecting the lighter-ingredient outlet pipe 50 to the body. The spider-ribs 69 on the outside of the end wall or cover 20 serve to strengthen the cover.

Referring to FIG. 9, it illustrates the use of an outlet passage tube 47-9 in a separator body which is substantially identical to that of the separator 65 shown in FIG. 7. Tube 47-9 extends to and between the end walls 20 and 21. Recesses 73 and 74 are formed in the inside surfaces of the end walls respectively for supporting the outlet passage tube 47-9 axially in the body. The inlet for the outlet passage 49-9 comprises a circumferentially arranged series of inlet openings 48-9 which are positioned radially inward with respect to the annular passage 38.

Referring to FIG. 10, the embodiment of the centrifugal separator shown therein is designated generally by reference numeral 75. The arrangement of the swirl chamber, collection chamber, inlet opening 29 for fluid to be treated, outlet 41 for the heavier ingredient, and outlet passage 49 for the clear lighter ingredient are substantially the same as the corresponding parts respectively of the separator 65 shown in FIG. 7. The separator 75 of FIG. 10 is a design which is simple to form. In this case, the front end wall 20-10 and the outer annular wall 19-10 are formed as a cup-shaped unit. The outer annular wall 19-10 is frusto-conical in configuration, the rear end portion thereof being of larger diameter than its front end portion which is integral with the front end wall 20-10. The outer annular wall 19-10 has a flange 76 extending outwardly from its rear end for accommodating fasteners 57 which extend through the outer marginal portion of annular rear end wall 22-10.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

What I claim is:

1. A centrifugal separator for separating a heavier ingredient from a lighter ingredient of a fluid mixture to be treated, comprising a body having an inner annular wall, said wall having a forward end and a rearward end and defining a swirl chamber in the body, the wall being open at its forward end thereby defining an annular free edge or rim of the wall, an end wall extending across the rearward end of said annular wall, an outer annular wall having a forward end and a rearward end and defining a collection chamber, said annular walls being substantially axially aligned, the inside diameter of the outer wall being larger than that of the inner wall, the outer wall extending forwardly beyond said rim as a circumferentially continuous imperforate portion, an annular end wall extending around and outwardly with respect to the inner wall to the rearward end of the outer wall thereby closing the rearward end of the outer wall, an end wall extending across the forward end of the outer wall and spaced forwardly of said rim thereby defining with said rim an annular passage for flow of said heavier ingredient from the swirl chamber to the collection chamber, a wall of the collection chamber having an outlet opening formed therein for withdrawing said heavier ingredient from the collection chamber, said outlet opening being disposed radially outward with respect to the inside surface of said inner wall and being spaced rearwardly of said annular passage, first outlet passage means leading from said outlet opening to outside said chambers for outflow of said heavier ingredient from the collection chamber, the body having means formed therein for admitting said fluid mixture into the swirl chamber and for imparting rotary motion to fluid in the swirl chamber, second outlet passage means extending through a wall of the body and open to the swirl chamber adjacent the line of the axis of the swirl chamber for flow of said lighter ingredient from the swirl chamber to outside the body and flow control means operatively associated with one of said outlet passage means for maintaining said chambers filled with fluid during treatment of said fluid mixture.

2. A centrifugal separator according to claim 1 in which said second outlet passage means is an opening formed in said end wall which extends across the rearward end of said inner annular wall.

3. A centrifugal separator according to claim 1 in which said fluid admitting means comprises an opening formed in said inner annular wall and adjacent said annular end wall and is directed tangentially with respect to the radii of said swirl chamber.

4. A centrifugal separator according to claim 1 in which said second outlet passage means comprises a central opening extending through the forward end wall.

5. A centrifugal separator for filtering sand and dirt particles from water, comprising a hollow body having an inner annular wall defining a portion of a swirl chamber and an outer annular wall defining a particles-collection chamber surrounding said swirl chamber, the chambers being concentric, each chamber having a front end and a rear end, front end wall means extending across the front ends of the chambers, and rear end wall means closing the rear ends of each of said chambers, a body wall peripherally coextensive with said inner annular wall and defining a second portion of said swirl chamber and having an inlet opening formed therein and opening into and directed tangentially of the radii of the swirl chamber and spaced rearwardly from said front end wall means, the inner annular wall having an annular passage formed therein concentric with the swirl chamber and spaced forwardly from said inlet opening for flow of said sand and particles from the swirl chamber to the collection chamber, the collection chamber being closed against flow communication with the swirl chamber except through said passage, one of said end wall means having a clear water outlet opening formed therein in axial alignment with the swirl chamber, the outer annular wall extending forwardly beyond the rearward boundary of said annular passage as a circumferentially continuous imperforate portion, first outlet passage means leading from said outlet opening to outside said chambers for outflow of clear water from said swirl chamber, said outer annular wall having a sand and particles opening formed therein and spaced rearwardly of said annular passage, second outlet passage means leading from said sand and particles outlet opening to outside said chambers for outflow of sand and particles from the collection chamber, and flow control means operatively associated with said sand and particles outlet passage for maintaining said chambers filled with fluid during treatment of said fluid mixture.

6. A separator according to claim 5 in which said clear water outlet opening is formed in the rear end wall means closing said swirl chamber, and an open-ended tube extends axially in the swirl chamber from the inside surface of the last-named rear end wall to adjacent the inside surface of said front end wall means.

7. A continuous flow process for separating a heavier ingredient from a lighter ingredient of a fluid mixture to be treated, the process comprising the steps of filling a swirl chamber with said mixture, said chamber having an axis and being circular in cross-section perpendicular to said axis and having two opposed ends, continuously introducing said mixture to be treated into said chamber proximate one of said ends, imparting rotary motion to fluid in said chamber around said axis to a velocity in which said heavier ingredient is moved centrifugally outward in said chamber and said lighter ingredient is moved centripetally inward in said chamber, passing said heavier ingredient with a minor portion of said lighter ingredient radially outward from said swirl chamber and reversing its axial direction of flow in a flow zone completely circumscribing said chamber and proximate the other of said chamber ends, collecting said heavier ingredient in a collection chamber circumscribing said flow zone, passing a major portion of said lighter ingredient from adjacent the axis of said swirl chamber directly out beyond the space occupied by said chambers, and maintaining said swirl and collection chambers filled with fluid throughout said process.

8. A process according to claim 7 in which said heavier ingredient is sand and said lighter ingredient is water.

9. A process according to claim 7 and including the step of intermittently exhausting said heavier ingredient from said collection chamber.

References Cited in the file of this patent

UNITED STATES PATENTS

| | | |
|---|---|---|
| 1,202,356 | Blachmer | Oct. 24, 1916 |
| 2,229,860 | McCurdy | Jan. 28, 1941 |
| 2,346,005 | Bryson | Apr. 4, 1944 |
| 2,425,110 | McCurdy | Aug. 5, 1947 |
| 2,425,932 | Green et al. | Aug. 19, 1947 |
| 2,672,215 | Schmid | Mar. 16, 1954 |
| 2,718,179 | Cram | Sept. 20, 1955 |
| 2,812,828 | Yellott et al. | Nov. 12, 1957 |
| 2,939,583 | Hett | June 7, 1960 |

FOREIGN PATENTS

| | | |
|---|---|---|
| 680,297 | Great Britain | Oct. 1, 1952 |